A. M. DEAN.
SEATING FOR VEHICLES.
APPLICATION FILED JUNE 8, 1917.
1,239,166.
Patented Sept. 4, 1917.
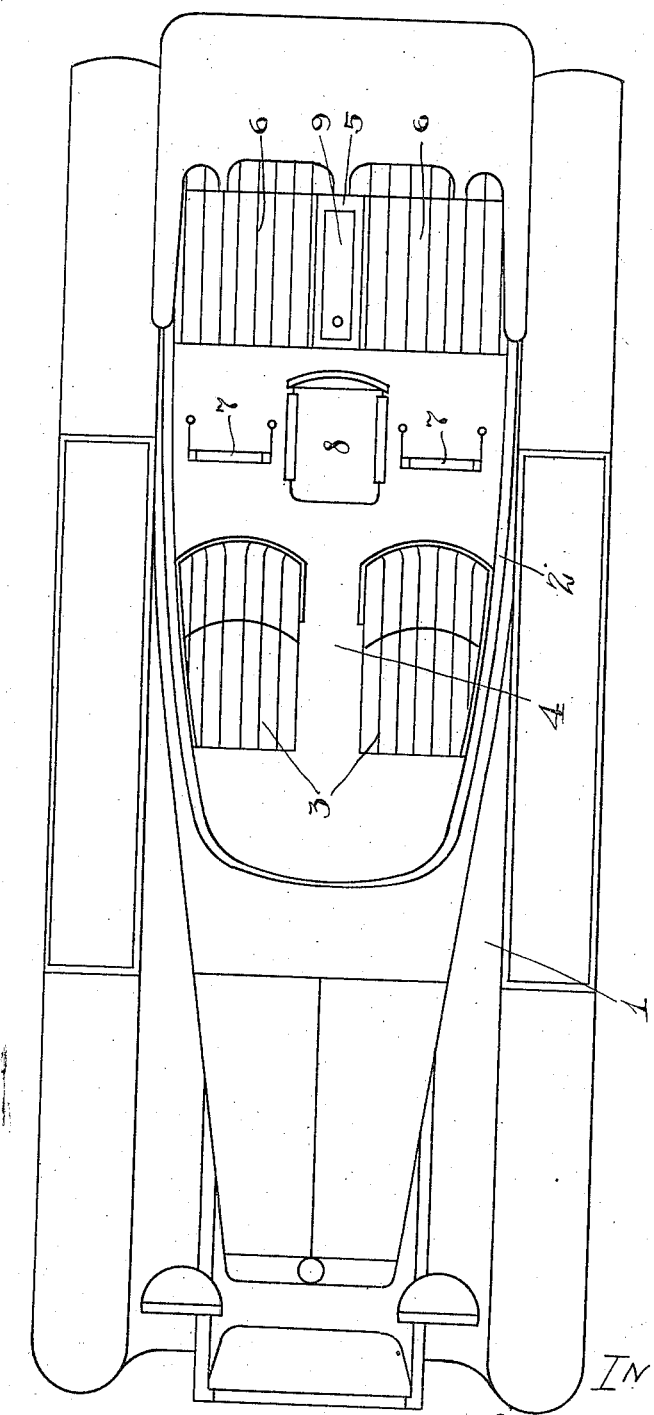
INVENTOR
Arthur Malcolm Dean
By Fay, Oberlin & Fay
ATTORNEYS

UNITED STATES PATENT OFFICE.

ARTHUR M. DEAN, OF CLEVELAND, OHIO, ASSIGNOR TO THE TEMPLAR MOTORS CORPORATION, OF CLEVELAND, OHIO, A CORPORATION OF DELAWARE.

SEATING FOR VEHICLES.

1,239,166.  Specification of Letters Patent.  Patented Sept. 4, 1917.

Application filed June 8, 1917. Serial No. 173,530.

*To all whom it may concern:*

Be it known that I, ARTHUR M. DEAN, a citizen of the United States, and a resident of Cleveland, county of Cuyahoga, and State of Ohio, have invented a new and useful Improvement in Seating for Vehicles, of which the following is a specification, the principle of the invention being herein explained and the best mode in which I have contemplated applying that principle, so as to distinguish it from other inventions.

The present invention, relating, as indicated, to the seating of a vehicle, is more particularly concerned with the provision in a motor-driven vehicle of a plurality of individual seats, each of which will afford the occupant a clear space in front for his feet and which will not be so crowded or discommode the occupants of the other seats. The ordinary five-passenger motor-driven vehicle has insufficient room in the rear seat for three people of ordinary size, although this seat is supposed to hold that number of occupants. It is impractical to widen the rear seat in such a vehicle, both because of the limitations of the frame as to width and the appearance of the body. In the present invention I have provided a rear seat on such a vehicle adapted to afford two separate single seats, each of good width, and also an additional single seat placed between the front seats and the rear, thus making the car a five-passenger car to avoid the crowding, which is usually met with in the rear seat. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

The single figure there appearing is a plan view of a vehicle body constructed as a part of a motor-driven vehicle and a body of my improved invention.

In the single figure there is shown a motor-driven vehicle 1 having a body 2 of substantially the same width in the rear as the front. In this body there are disposed two spaced single seats 3 which constitute the front seats and which are separated by a narrow passage or aisle 4, which is disposed centrally of the vehicle body. The rear seat is centrally divided by means of a horizontal partition 5 into two separate individual seats 6, which are substantially directly back of the seats 3.

For convenience a foot rest 7 is provided for each of the seats and between these two foot rests 7 and on a line with the aisle 4 and the partition 5 is disposed an additional single seat 8. The partition 5 between the rear seats is formed of sufficient width to bring the occupants of the rear seats to the side of the central seat 8. The occupant of the latter seat has sufficient foot room in the aisle between the front seats 4, and it is thus possible to conveniently accommodate five people in a body of this type without any crowding and without widening the rear seat, which can in fact be made somewhat narrower than is the usual practice. As a result of this narrowing of this seat, the lines of the body can be made very much better and the usual bulge at the rear can be entirely avoided.

In addition to the avoidance of crowding on the rear seat, the latter, by being divided by the partition 5, provides two very comfortable single seats, since the presence of the arm or partition tends to prevent the occupants from sliding in going around curves, while the partition may be provided with a small compartment to receive gloves or other articles, which compartment is covered by a hinged top 9. The central seat 8 may be of greater size than are the usual extra seats disposed in front of the rear seat, and, if desired, may be provided with arms for increased comfort. The central seat 8 may of course be of any suitable type, either fixed or folding, and if folding, it may be constructed to fit into a compartment formed in the floor in the tonneau of the vehicle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle of the character described, the combination of separate laterally spaced front seats, a rear seat divided into two single seats, and an extra single seat disposed between said front and rear seats and alined with the space between said front seats.

2. In a vehicle of the character described, the combination of separate laterally spaced front seats, a rear seat having a partition dividing the same into two separate single seats, and an extra single seat disposed between said front and rear seats and alined with such partition and the space between said front seats.

Signed by me, this 26 day of May, 1917.

ARTHUR M. DEAN.

Copies of this patent may be obtained for five cents each, by addressing the "Commissioner of Patents, Washington, D. C."